United States Patent [19]

Sontheimer

[11] Patent Number: 4,558,375
[45] Date of Patent: Dec. 10, 1985

[54] METHOD AND APPARATUS FOR RECORDING AND RETRIEVING VIDEO INFORMATION IN TWO MODES ON A SINGLE LASER RECORDING DISC

[76] Inventor: Carl G. Sontheimer, 14 Grays Oaks La., Greenwich, Conn. 06830

[21] Appl. No.: 489,164

[22] Filed: Apr. 27, 1983

[51] Int. Cl.⁴ .............................................. H04N 5/76
[52] U.S. Cl. .................................... 358/342; 358/338; 369/50; 369/111
[58] Field of Search .................. 358/342, 338; 369/50, 369/11, 30, 32, 33, 275; 360/10.1, 9.1, 73

[56] References Cited

U.S. PATENT DOCUMENTS

| | | | |
|---|---|---|---|
| 3,829,610 | 8/1974 | Meeussen et al. | 358/342 |
| 4,142,209 | 2/1979 | Hedlund et al. | 369/111 |
| 4,223,349 | 9/1980 | Dakin et al. | 358/342 |
| 4,403,259 | 9/1983 | Masaki | 358/342 |
| 4,463,389 | 7/1984 | Golding | 360/10.1 |
| 4,514,771 | 4/1985 | Stark et al. | 360/73 |

Primary Examiner—Donald McElheny, Jr.
Attorney, Agent, or Firm—Parmelee, Bollinger & Bramblett

[57] ABSTRACT

There is disclosed method and apparatus for recording and retrieving video information in two modes on a single laser recording disc. An annular portion of the disc carries still frame information recorded at a constant angular velocity. One still frame occupies a track or groove extending around exactly one full revolution of the disc recorded at constant angular velocity. Thus, any given still frame is presented on the video screen by repeatedly scanning one track for so long as that particular still frame is desired to be shown on the video screen. Another annular portion of the disc carries video information, i.e. the dynamic parts of a video program, recorded at constant linear velocity along the track or groove being scanned on the disc. A scanning head may be selectively shifted beween the two annular regions in order to incorporate predetermined still frames into the video program at desired spots during the program. The disc drive speed is adjusted to provide the correct angular or linear velocity depending upon the portion of disc being played back at any instant. If desired, a controller automatically can fill the video screen with pertinent or interesting presentations during the brief time intervals whenever the scanning head is being shifted fron one portion of the disc to another.

5 Claims, 3 Drawing Figures

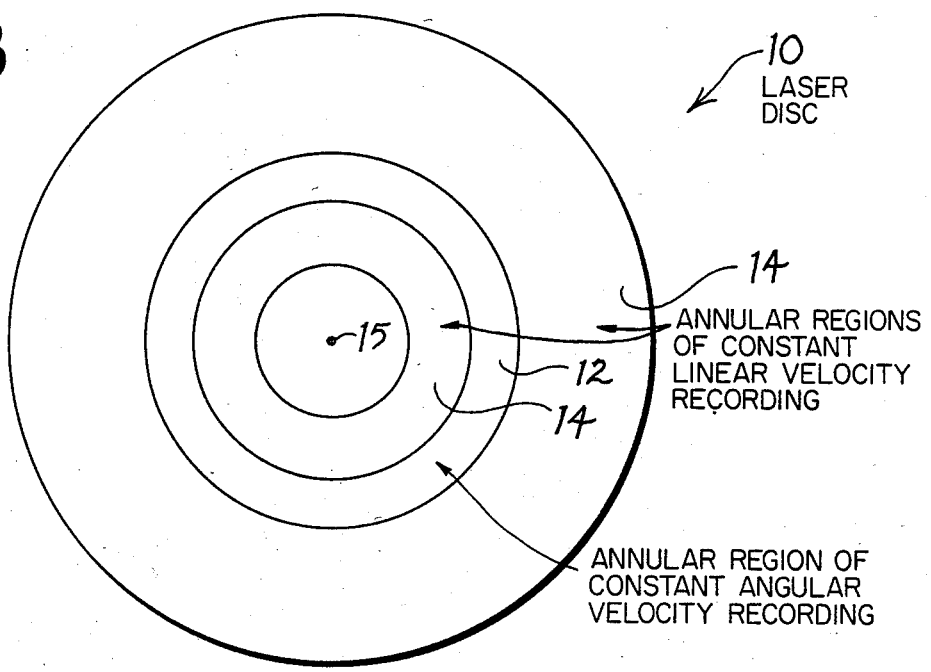

METHOD AND APPARATUS FOR RECORDING AND RETRIEVING VIDEO INFORMATION IN TWO MODES ON A SINGLE LASER RECORDING DISC

BACKGROUND OF THE INVENTION

Laser disc players have two possible modes of operation which the industry have heretofore considered to be incompatible or mutually exclusive. In one mode the information is stored and retrieved at constant angular velocity. Exactly one revolution along each track or groove then contains one frame of a television or video picture. This one frame can be read out and displayed as a still by repeatedly scanning the same track or groove for so long as this still picture is desired to be held on the screen. Thus, the same groove is scanned (played back) repeatedly, and there is no progression of the scanning head along to the next groove until the still frame is terminated.

In the second mode, information is stored and retrieved at constant linear velocity along the track (groove) being scanned. In this latter mode, as the scanning head progresses outwardly farther from the axis of rotation of the disc, the RPM of the disc drive progressively decreases so that the linear velocity along the track of the disc portion being scanned at each instant by the readout (playback) head remains constant. In this constant linear velocity mode as the diameter of the track progressively increases, the linear length of the track correspondingly lengthens per revolution. Consequently, more than one picture frame is recorded along the track per revolution, and each successive revolution of the track contains more picture elements than the preceding one. A principal advantage of utilizing the constant linear velocity mode is that the playing time for a disc of given size can be much longer than is possible with constant angular velocity recording in that same size of disc.

Heretofore, the laser disc recording industry has been under the universal belief or state of understanding that it is not possible to record a program at constant angular velocity on a disc and also to incorporate still frames into the program. As a consequence of this present universal belief or state of mind in this industry, any program required to contain still frames is recorded entirely at constant angular velocity on the whole disc, which is wasteful of overall playing time. In other words, the playing time of the constant angular velocity recorded disc is relatively brief. Conversely, in this laser disc industry it is current practice that, if a program can be contrived to be devoid of still frames, then the program is recorded on the disc at constant linear velocity in order to utilize the available area on the laser disc more efficiently for achieving as long a playing time as possible with the disc.

SUMMARY OF THE INVENTION

In my thinking, there are certain circumstances under which it is desirable to combine the advantages on one laser disc of longer playing time, achievable with constant linear velocity, with the ability of displaying still frames interspersed into the program appropriate critical moments in the drama, or travel story or instructional presentation, etc. through use of constant angular velocity for achieving dramatic impact, suspense, transitions, emphasis in advertising or sales presentations, for enhancing retention of vital information in educational or instruction programs, for showing clearly medical procedures, and for many other worthwhile reasons.

Accordingly, it is a primary object of the present invention to provide method and apparatus for combining the advantages of constant angular velocity storage and constant linear velocity storage utilizing the same storage disc and to provide a novel laser disc record. Other objects, features, and advantages will become understood from a consideration of the following description and appended claims.

In practicing this invention there is the storage of video information in at least two modes on a single laser recording memory disc. First video information relating to still frame video presentations is stored on the disc in a first annular region at a substantially constant angular velocity. The second video information relating to the main dynamic video presentation or main body of the program is then stored on the same disc in a second annular region at a substantially constant linear velocity. A microprocessor controller at the appropriate moments shifts the scanning head from the main program (constant linear velocity region of the disc) over to the still frame presentations (constant angular velocity region of the disc preferably nearer the disc's axis). This controller can also automatically show appropriate text or displays or designs, or other appropriate video material, on the video screen during the brief time intervals while the scanning head is being shifted from one region of the disc to the other. Thus, the viewer's attention is retained on the screen, and also the transitions from dynamic presentations to still frames and back to dynamic presentations are accomplished smoothly and attractively without allowing blank intervals to occur on the screen.

BRIEF DESCRIPTION OF THE DRAWINGS

FIG. 3 is a plan view of a modified laser recording video disc in accordance with the present invention.

DESCRIPTION OF THE PREFERRED EMBODIMENT

Figure 1:
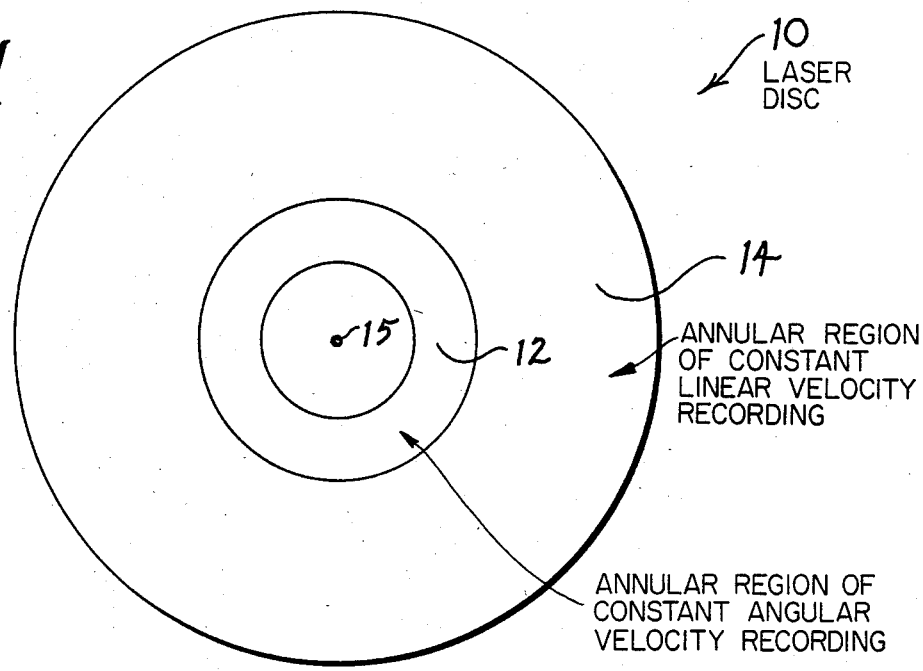
FIG. 1 is a plan view of a laser recording memory storage video disc in accordance with the present invention, illustrating the two principal annular storage regions thereof.

With particular reference to FIG. 1, there is illustrated a video storage disc 10 which may be, for example, a laser disc. The disc 10 is separated into two annular regions—an inner or central region 12 within which information is stored at a constant angular velocity and an outer region 14 within which information is stored at a constant linear velocity. It is to be understood that the showing of FIG. 1 is schematic only. In an actual disc there would probably be no line or visual indication of the boundary between the two regions. Also, it is to be understood that the relative sizes of these two annular regions 12 and 14 will depend upon the particular program which is recorded on the laser disc 10. If this program incorporates a considerable number of still frames, then the inner annular region 12 will be of sufficiently large radial extent, i.e. it will be sufficiently wide, to include all of these still frames. If the program incorporates only a few still frames, then this inner annular region 12 will be relatively narrow.

Figure 2:
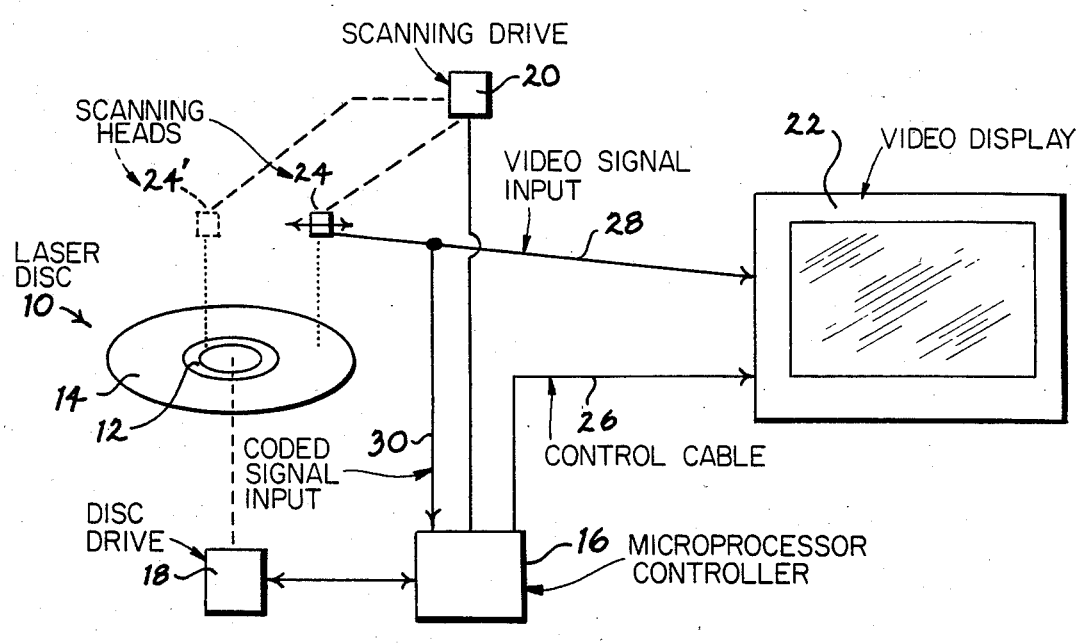
FIG. 2 is a schematic illustration of method and apparatus employed in recording and retrieving video information from the storage disc of FIG. 1.

FIG. 2 illustrates schematically method and apparatus employed for either recording on, or reading from, the disc record of FIG. 1. The various elements of the system are controlled from a microprocessor controller 16. These elements include a disc drive 18, a scanning drive 20, and a video display 22. The scanning drive 20 controls, in turn, the position of a scanning head 24 which reads (plays back) the information recorded on the disc 10. (A similar system is employed for recording on the disc 10. In this case, the element 24 is a laser, rather than a scanning head).

It will be understood that the constant angular velocity region 12 and the constant linear velocity region 14 can be placed anywhere on the disc 10. However, the constant angular velocity region carries the information for reproducing as many single frames or still pictures as may be desired to be incorporated in the overall program. Each still frame occupies a track (groove) extending exactly one revolution around the axis 15 of rotation of the disc 10. In order to show a still frame on the video screen 22, for example such as a television screen, a given track is repeatedly scanned at constant angular velocity for so long an interval of time as the given still frame is shown on the screen 22. In other words, this given track is scanned (read) over and over at constant angular velocity until the still frame presentation is ended.

In order to utilize the area of the disc 10 as efficiently as possible, I prefer that the constant angular velocity recorded annular region 12 be located nearer the axis 15 in the smaller diameter portion of the disc 10, while the constant linear velocity recorded annular region 14 is located further from the axis in the larger diameter portion of the disc. The information contained in the constant linear velocity region 14 of the disc includes many frames of the program in serial relationship. This constant linear velocity information is most advantageously contained in larger diameter region 14 of the disc 10 to thereby increase the available playing time from a disc of given size.

This invention permits combining the advantages of constant angular velocity and constant linear velocity recording in a single disc. Assume, for example, that the system of FIG. 2 is playing in the constant linear velocity mode for showing a dynamic sequence in a program. This dynamic showing on the television screen 22 involves the scanning head 24 progressively scanning (reading) along a track in the outer region 14 of disc 10. As the scanning head 24 progressively moves outwardly, the disc drive 18 under the control of the microprocessor 16, slows the rotational speed of disc 10 to keep the linear velocity of the scanned track constant as the video program is being shown on the screen 22. When it is desired to display a particular still frame at a particular appropriate spot during the program, the scanning drive 20, under the control of the microprocessor 16, causes the scanning head 24 to stop scanning at the desired point in the outer region 14 and to shift quickly inwardly to a predetermined track (groove) in the constant angular velocity region 12 of disc 10.

At the same time as this shift in scanning is occurring, the disc drive 18 increases the speed of the disc 10 to the proper speed for constant angular velocity playback. The scanning head 24 then remains in one position for reading a desired frame and for playing it for as long as the operator wishes or as has been pre-established by programming of the microprocessor 16. Thereafter, after the end of the still frame presentation, the microprocessor 16 causes the scanning drive 20 to return the scanning head 24 to the same point on the groove in the linear velocity portion 14 of the laser disc for returning to continue presentation of the dynamic program, and the speed of the disc 10 is reduced to the proper speed for achieving the constant linear velocity scanning at that point.

There are many reasons why a video program will be enhanced by the inclusion of still frames, as indicated briefly in the introductory summary. For example, in a drama still frames may be included for suspense, dramatic impact or for transitions from one scene to another. In travel, nature or geography stories, still frames may be used to capture unusual attitudes of birds or animals or to retain fleeting attractive bursts of color during a sunset or to show unusual patterns in fast-scudding clouds or other important relationships which would otherwise escape the viewer's attention or appreciation in an on-going dynamic presentation. During instructional, advertising or sales presentations, still frames may be included for emphasis, for enabling the viewer to learn or to retain vital information or for presenting scientific or medical relationships. Still frames will show critical moments during classical sporting events, and so forth.

The reason why the microprocessor 16 is connected by an electrical control cable 26 directly to the video display 22 will now be explained. During the brief transitional moments while the scanning head 24 is being shifted from one to the other of the two recorded regions 12 and 14, there is a brief interruption of the electrical signals normally being transmitted over the electrical cable 28 from the scanning head 24 to the video display. Consequently, the screen would become blank during this brief interruption as a result of lack of signals. The microprocessor 16 is programmed to fill in these transitions by causing the screen to show pertinent information or displays for retaining the viewer's attention. These brief interim presentations may relate to the forthcoming or preceding still frame, in effect bracketing the still frame, for enhancing appreciation of its overall significance. The microprocessor controller 16 may include audio information or voice or music recordings which are included with these brief interim presentations.

As an alternative modification, the transfer of a single scanning head 24 back and forth between the two regions 12 and 14 of disc 10 may be avoided. This may be accomplished by utilizing the scanning head 24 for scanning only the constant linear velocity region 14 while employing an auxiliary scanning head 24' (as illustrated in dotted lines) for scanning the constant angular velocity region 12.

As shown by the line 30 a cable may extend from scanning head 24 to the microprocessor 16. In order to delineate those predetermined spots in the program information within region 14 at which the scanning is intended to switch over from region 14 to the scanning of predetermined still frame information within region 12, video code signals may be recorded in region 14 at those predetermined spots. These video code signals are scanned (read) by the scanning head 24, and the resultant coded electrical signals are transmitted via the cable 30 to the microprocessor 16 for instructing the microprocessor to carry out the sequence of operations required to effectuate switching over to the presentation of the desired still frame for the desired length of time. These video code signals may also instruct the microprocessor to initiate presentation of the desired fill-in (interim) video display during the brief interval while such a switch over is occurring.

Verification or identification video code signals also may be associated in region 12 with the information for each predetermined still frame presentation. Thus, resulting code signals are transmitted via cable 30 for instructing the microprocessor whether or not the desired predetermined still frame information is being scanned in the region 12, and if not, for causing the microprocessor to actuate the scanning drive for nudging the scanning head over to read the desired still frame track.

As shown in FIG. 3 the annular region 12 containing the still frame video information recorded at constant angular velocity is interposed on the disc 10 between two annular regions 14 containing video information recorded at constant linear velocity. By virtue of locating the region 12 between the regions 14 the switch over from constant linear velocity scanning of one of the regions 14 to constant angular velocity scanning of the region 12 and back again is facilitated because the average radial distance separations between the respective regions on the disc are reduced as compared with FIG. 1. Also, it is to be understood in the event there are considerable amounts of still frame information to be recorded at constant angular velocity on one disc and lesser amounts of information to be recorded at constant linear velocity on that same disc, then the locations of these respective regions can be reversed, in other words there are two of the regions 12 with a region 14 interposed between them.

It is believed that the many advantages of this invention will now be apparent to those skilled in the art. It will also be apparent that a number of variations and modifications may be made in the method and apparatus as shown without departing from the spirit and scope of this invention. Accordingly, the foregoing description is to be construed as illustrative only, rather than limiting. This invention is limited only by the scope of the following claims.

I claim:

1. The method of storing video information in at least two modes on a single memory laser disc which comprises the steps of:
   recording still frame video information on said disc in a first annular region at a substantially constant angular velocity at the rate of one still frame per scanning revolution,
   recording video program information relating to said still frame information on said disc in a second annular region at a substantially constant linear velocity,
   wherein said first annular region is of relatively smaller diameter and said second annular region is of relatively larger diameter, and
   recording video code signals in said second annular region at those predetermined spots in the video program at which predetermined still frame information is intended to be included in the program.

2. The method of recording and retrieving video information from a laser disc comprising the steps of:
   recording first video information as still frame information in a first annular region at constant angular velocity at the rate of one still frame per revolution of the disc,
   recording in a second annular region at a substantially constant linear velocity second video information as a video program to which are related the still frames recorded in said first annular region, said first annular region having a smaller diameter than said second annular region,
   recording video code signals in said second annular region at those predetermined locations in the video program where predetermined still frames are to be presented,
   reading and presenting on a screen the video program from said second region until a predetermined video code signal is encountered in the program calling for a predetermined still frame presentation on the screen,
   then repeatedly reading from the appropriate predetermined portion of said first region for presenting the predetermined still frame on the screen for so long as desired by repeatedly reading said predetermined portion,
   then returning to the reading of said second region for resuming the video program at a location near said video code signal.

3. Apparatus for storing video information on a laser disc which comprises:
   a memory storage laser disc;
   means for storing first video information comprising at least one still frame on said disc in a first annular region at a substantially constant angular velocity; and
   means for storing second video information comprising a video program to which said still frame is related at a predetermined time interval during said video program on said disc in a second annular region at a substantially constant linear velocity,
   said first annular region having a smaller diameter than said second annular region, and
   said second region including coded video signals associated with said predetermined time interval for initiating the switching over at said interval from reading the video program in said second region to the reading of the still frame information in said first region.

4. Apparatus for giving a video presentation from a laser disc including still frame video information recorded upon a first annular region of the disc at constant angular velocity and video program information recorded upon a second annular region of the disc at constant linear velocity, said still frame being related to the video program at a predetermined spot in said program, comprising means for selectively reading the video information from these two annular regions of the disc for presenting the video program by reading the second region, means for switching over at said predetermined spot for reading the first region for presenting the related still frame and then for switching back at the conclusion of presenting the still frame for reading the second region for resuming presentation of the video program following said predetermined spot, and means for presenting appropriate video material for maintaining continuity for retaining the viewer's interest during the brief intervals occurring while switching the reading between the respective regions of the disc.

5. A video laser disc which comprises:
   a first annular region nearer the axis of rotation of the disc within which is stored video information recorded at constant angular velocity relating to at least one still frame video presentation, such still frame information being complete within one revolution of the disc, and the corresponding still frame being displayed by repeatedly scanning the still frame information at constant angular velocity, a second annular region farther from the axis than said first region within which is stored second video information recorded at constant linear velocity, said second video information relating to a video program in which said still frame is intended to be included at a predetermined spot in the program, said second annular region including coded video control signals associated with said predetermined spot in the program for signalling that the still frame is to be displayed.

* * * * *